US00RE34471E

United States Patent [19]

Kameoka et al.

[11] E Patent Number: Re. 34,471

[45] Reissued Date of Patent: Dec. 7, 1993

[54] HYDROGEN-ABSORBING ALLOY ELECTRODE FOR USE IN AN ALKALINE STORAGE CELL AND ITS MANUFACTURING METHOD

[75] Inventors: Seiji Kameoka; Nobuhiro Furukawa, both of Osaka; Mitsuzo Nogami, Kyoto; Motoo Tadokoro, Ashiya, all of Japan

[73] Assignee: Sanyo Electric Co., Ltd., Moriguchi, Japan

[21] Appl. No.: 921,339

[22] Filed: Jul. 29, 1992

Related U.S. Patent Documents

Reissue of:

[64] Patent No.: 5,043,233
Issued: Aug. 27, 1991
Appl. No.: 490,237
Filed: Mar. 8, 1990

[30] Foreign Application Priority Data

Mar. 10, 1989 [JP] Japan ..... 1-59153

[51] Int. Cl.[5] ..... H01M 4/38

[52] U.S. Cl. ..... 429/59; 429/101; 252/182.1; 29/623.5

[58] Field of Search ..... 429/59, 101, 206; 29/623.5; 252/182.1

[56] References Cited

U.S. PATENT DOCUMENTS 3,966,493 6/1976 Jung ..... 429/223 X
4,621,417 11/1986 Mohri et al. ..... 429/101 X

FOREIGN PATENT DOCUMENTS 62-252072 11/1987 Japan .
62-285360 12/1987 Japan .
62-287568 12/1987 Japan .
63-141258 6/1988 Japan .
63-166146 7/1988 Japan .
63-175342 7/1988 Japan .
63-314777 12/1988 Japan .
1-6366 1/1989 Japan .
1107465 4/1989 Japan .

*Primary Examiner*—Stephen Kalafut
*Attorney, Agent, or Firm*—Armstrong, Westerman, Hattori, McLeland & Naughton

[57] ABSTRACT

A hydrogen-absorbing alloy electrode for use in an alkaline storage cell, comprising a hydrogen-absorbing alloy for reversibly absorbing and desorbing hydrogen; and a metal oxide or metal hydroxide existing in the state of a metal in a range of electric potential where said hydrogen-absorbing alloy electrochemically absorbs and desorbs hydrogen in an alkaline electrolyte.

12 Claims, 4 Drawing Sheets

HYDROGEN-ABSORBING ALLOY ELECTRODE FOR USE IN AN ALKALINE STORAGE CELL AND ITS MANUFACTURING METHOD

Matter enclosed in heavy brackets [ ] appears in the original patent but forms no part of this reissue specification; matter printed in italics indicates the additions made by reissue.

BACKGROUND OF THE INVENTION (1) Field of the Invention

The present invention relates to a hydrogen-absorbing alloy electrode for use in an alkaline storage cell and its manufacturing method.

(2) Description of the Prior Art

In recent years, a metal-hydrogen alkaline storage cell employing a hydrogen-absorbing alloy for its negative electrode has attracted attention as a replacement for a nickel-cadmium storage cell. If a hydrogen-absorbing alloy of the right type having the right composition is employed, the metal-hydrogen alkaline storage cell remarkably enhances cell life and energy density. It means that developing an improved hydrogen-absorbing alloy electrode is essential for this type of storage cell.

Conventionally, a hydrogen-absorbing alloy, especially the one having a small grain size, is easy to oxidize on its surface during its pulverization, electrode production, or cell assembly. This oxidation increases contact resistance among the grains of the hydrogen-absorbing alloy, and thus lowers conductivity of the electrode for which the alloy is employed. As a result, charge-discharge efficiency, especially the one during a rapid charge discharge, is decreased. Furthermore, since the rapid charge-discharge generates hydrogen gas in the negative electrode through a side reaction, hydrogen gas partial pressure in the cell is raised. This brings about electrolyte leakage or dryout, thereby deteriorating the cell performance.

The following methods have been proposed in order to solve the above problems: a) adding a metal conductor to the hydrogen-absorbing alloy electrode as disclosed in Japanese Patent Publication Kokai No. 53-103543; and b) coating the hydrogen-absorbing alloy grains with a thin film of copper as disclosed in Japanese Patent Publication Kokai No. 50-111546.

However, these methods still involve the following problems.

a) The metal conductor, which is added in the state of a metal, not in the state of a compound, comprises large grains. Accordingly, it is extremely hard to uniformly distribute it in the electrode and its effects as a conductor are not fully obtained.

b) An additional process of coating the alloy grains with a thin film of copper complicates the procedure, which raises manufacturing cost.

SUMMARY OF THE INVENTION

Accordingly, a primary object of this invention is to offer a hydrogen-absorbing alloy electrode for use in an alkaline storage cell and its manufacturing method, the electrode having improved conductivity.

Another object of this invention is to offer a hydrogen-absorbing alloy electrode for use in an alkaline storage cell and its manufacturing method, the electrode having a conductor uniformly distributed therein for lowering contact resistance among grains of its hydrogen-absorbing alloy.

Still another object of this invention is to offer a hydrogen-absorbing alloy electrode for use in an alkaline storage cell and its manufacturing method, the electrode improving a cycle characteristic of its alkaline storage cell during rapid charge-discharge.

Still another object of this invention is to offer a manufacturing method of a hydrogen-absorbing alloy electrode for use in an alkaline storage cell for attaining the above objects without raising manufacturing cost.

The above objects are fulfilled by a hydrogen-absorbing alloy electrode for use in an alkaline storage cell, the electrode comprising a hydrogen-absorbing alloy for reversibly absorbing and desorbing hydrogen; and a metal oxide or hydroxide existing in the state of a metal in a range of electric potential where the hydrogen-absorbing alloy electrochemically absorbs and desorbs hydrogen in an alkaline electrolyte. The above electrode will be referred to as the electrode [A] hereinafter.

The electrode [A] is manufactured by a manufacturing method of a hydrogen-absorbing alloy electrode for use in an alkaline storage cell, comprising the steps of producing hydrogen-absorbing alloy powders; kneading the above powders, a metal oxide or hydroxide existing in the state of a metal in a range of electric potential where the hydrogen-absorbing alloy electrochemically absorbs and desorbs hydrogen in an alkaline electrolyte, and a binder into a paste; and coating the paste on a conductive substrate.

The metal oxide may be at least one selected from the group consisting of CuO, $Cu_2O$, $Ag_2O$, $Ag_2O_2$, PbO, [$Ti_2O_3$,] $AuO_2$ and $Au_2O_3$.

The metal hydroxide may be at least one selected from the group consisting of $Cu(OH)_2$[, $Ti(OH)_3$] and $Au(OH)_3$.

It is for the following two reasons that the above objects are fulfilled by the above constructions and methods.

[1] The metal oxide or hydroxide employed in the hydrogen-absorbing alloy electrode has small enough a grain size to uniformly distribute in the electrode.

[2] The metal oxide or hydroxide is reduced into a metal in a range of electric potential where the hydrogen-absorbing alloy electrochemically absorbs and desorbs hydrogen in an alkaline electrolyte. Accordingly, the electrode has excellent conductivity when the cell is in operation.

Because of the above [1] and [2], contact resistance among the hydrogen-absorbing alloy grains is decreased, whereby conductivity of the hydrogen-absorbing alloy electrode is improved. The improvement is especially remarkable when the grain size of the hydrogen-absorbing alloy is small enough to easily oxidize. As a result of this improvement, charging-discharging efficiency (especially the one during the rapid charge-discharge) is enhanced and thus cycle characteristic is improved.

Moreover, since hydrogen gas generation from the negative electrode is restricted, hydrogen gas partial pressure is not raised in the cell. This prevents electrolyte leak or dryout, which also improves cell performance.

The above [2] will be explained in detail referring to FIGS. 1 through 3 hereinafter. FIG. 1 is an electric potential - pH chart in the case an oxide or hydroxide of Cu is employed as a conductor, FIG. 2 in the case of an oxide or hydroxide of Ag, and FIG. 3 in the case of La. In these figures, Line 1 indicates the electric potential of the negative electrode and line 2 indicates the pH (set for 15 in the figures) of the electrolyte. An intersection a of Lines 1 and 2 is a potential of the negative electrode in the cell (approx. −0.9 V in every case).

As apparent from FIG. 1, the potential of $Cu_2O \rightleftarrows Cu$ is −0.4 to −0.5 V, which is higher than that of the negative electrode. Accordingly, existing in the range of potential where hydrogen is absorbed and desorbed is the metal Cu, not an oxide or hydroxide of Cu.

In FIG. 2 also, the electric potential of $Ag_2O \rightleftarrows Ag$ is approx. 0.2 V, which is higher than that of the negative electrode. Accordingly, existing in the range of potential where hydrogen is absorbed and desorbed is the metal Ag, not an oxide or hydroxide of Ag.

Experiments have confirmed that the same results are obtained in the case of Au though not indicated by a figure here.

In the case of La, on the other hand (FIG. 3), the electric potential of $La \rightleftarrows La(OH)_3$ is approx. −3 V, which is lower than that of the negative electrode. In consequence, once the metal La is oxidized into $La(OH)_3$, there is no turning back to La, which prevents improvement in the electrode conductivity.

In the electrode [A], the metal oxide or hydroxide may have an average grain size of 50 μm at the maximum.

In the above, the metal oxide or hydroxide has an average grain size of 50 μm or less, which further improves its distribution in the electrode and thus makes better effects.

In the electrode [A], an amount of the metal oxide or hydroxide may be set so that an amount of electricity required to reduce the metal oxide or hydroxide into a metal is 15% at the maximum of a capacity of the hydrogen-absorbing alloy electrode.

If the metal oxide or hydroxide is added in a larger ratio than the above-mentioned, a huge amount of electricity is required to reduce the metal oxide or hydroxide in the electrode during charge-discharge cycles for electrochemical formation or the like. This restricts charging of the negative electrode to the point of damaging the balance in the charging amount between the positive and negative electrodes. However, if the amount of the metal oxide or hydroxide is within the above-mentioned range, there is no such problem and so the cycle characteristic of the cell is surely protected from deteriorating.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

Embodiment I

Embodiment according to the present invention

Misch metal (a mixture of rare earth elements), Ni, Co, Al and Mn, all commercially available, were measured out in an element ratio of 1:3.2:1:0.2:0.6, thereafter they were dissolved in an arc furnace having an argon inactive atmosphere, whereby an ingot of a hydrogen-absorbing alloy expressed by $MmNi_{3.2}CoAl_{0.2}Mn_{0.6}$ was obtained. Then, the ingot was mechanically pulverized into grains having an average diameter of 50 μm or less.

The above grains were mixed with CuO (metal oxide) having an average grain size of 10 μm. The amount of CuO was determined so that the amount of electricity required to reduce CuO into Cu correspond to 10% of the capacity of the completed negative electrode. The above-obtained mixture was kneaded with polytetrafluoroethylene (PTFE) as a binder into a paste, and the paste was pressure-coated on both surfaces of a collector formed of a punched metal, whereby a hydrogen-absorbing alloy negative electrode was produced.

The above negative electrode and a nickel sintered positive electrode having a larger enough capacity (600 mAh) than the negative electrode were wound around with a separator interposed therebetween to obtain an electrode assembly. Then, the assembly was put into a cell can, an aqueous solution of KOH of 30wt. % was injected into the cell can, and the cell can was sealed to produce a sealed nickel-hydrogen storage cell. This cell will be referred to as Cell A.

Comparative example

Cell X was produced by the same method as Cell A except that CuO was not added.

Experiment

Figure 1:
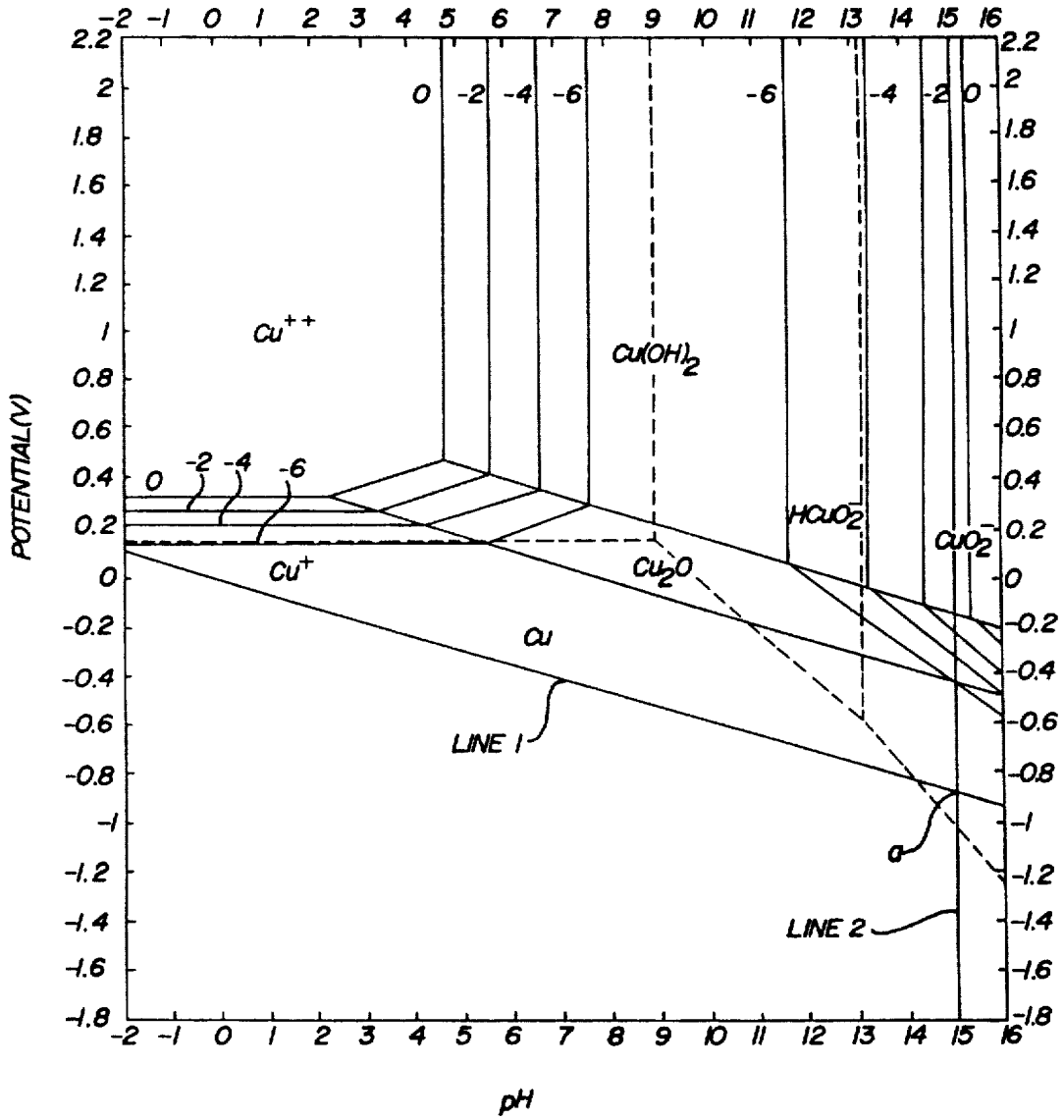
FIG. 1 is an electric potential - pH chart in the case an oxide or hydroxide of Cu is employed as a conductor.
Figure 2:
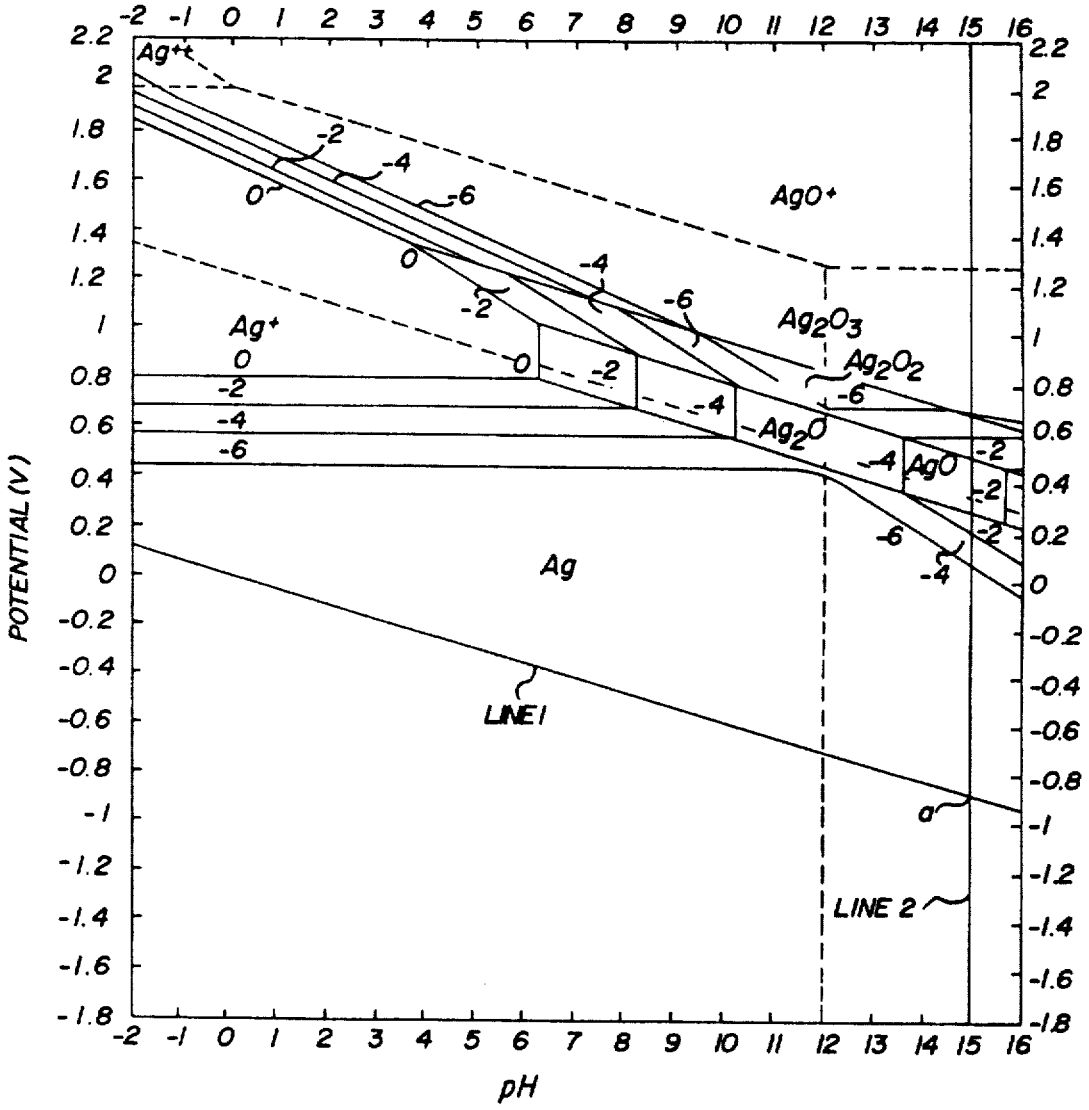
FIG. 2 is an electric potential - pH chart in the case an oxide or hydroxide of Ag is employed as a conductor.
Figure 3:
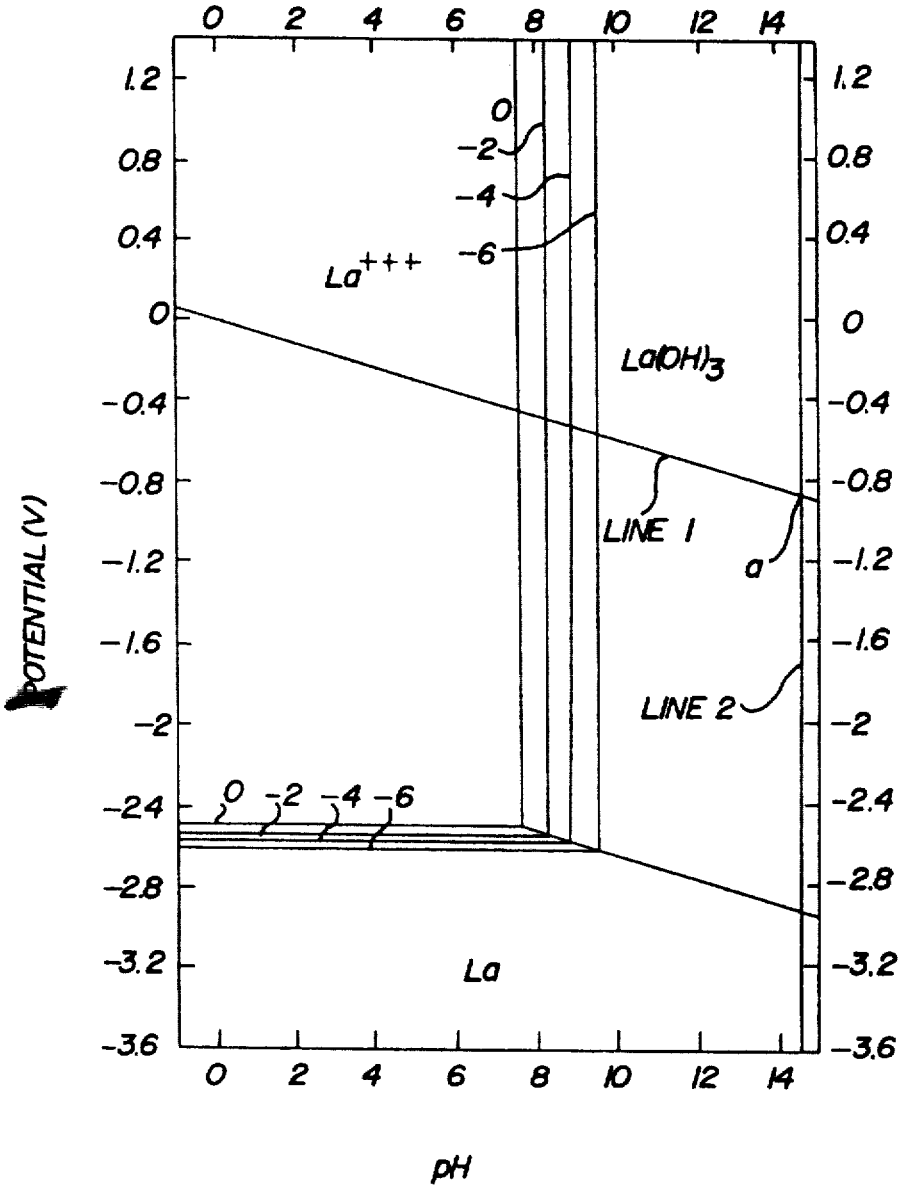
FIG. 3 is an electric potential - pH chart in the case La is employed as a conductor.
Figure 4:
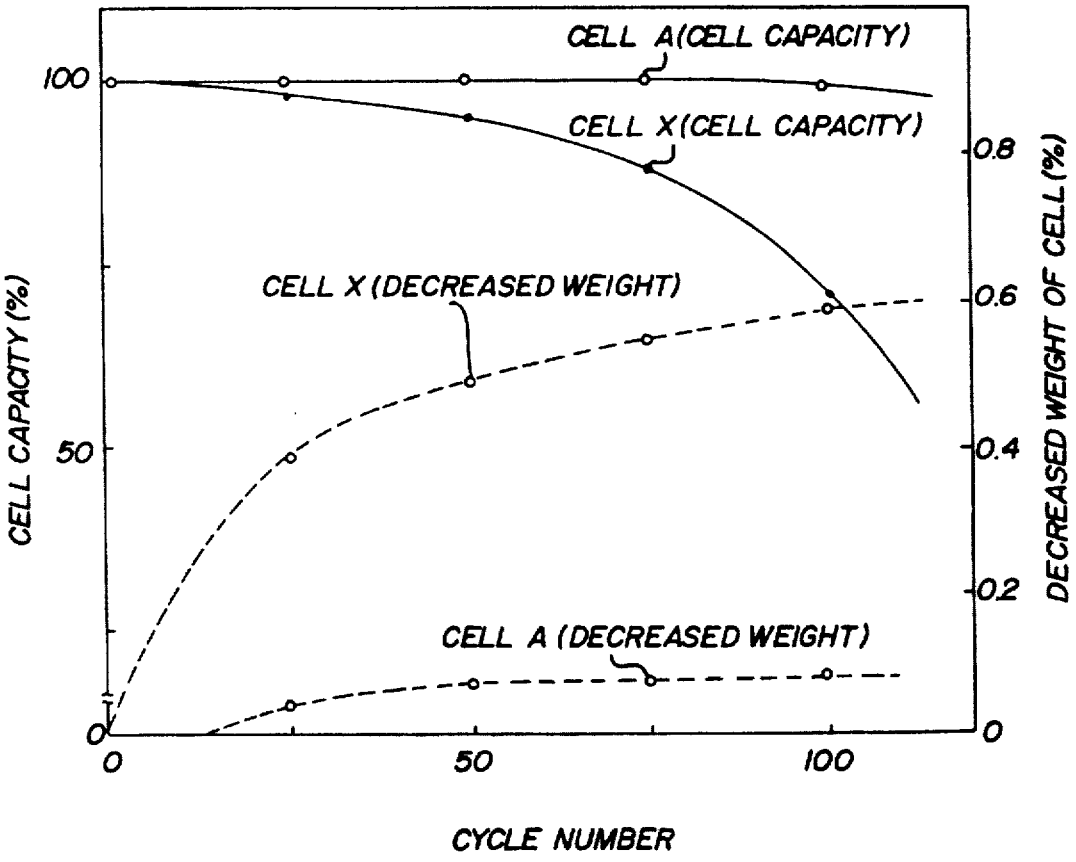
FIG. 4 is a graph showing the relationship among cycle number, cell capacity and decreased weight concerning Cell A according to this invention and Cell X as a comparative example.

Cycle characteristics of Cells A and X were checked and shown in FIG. 4. The cells were charged with a charging current of 500 mA per 1 g of the hydrogen-absorbing alloy used for the negative electrode until a set charging amount of 720 mAh is fulfilled and then were discharged by a discharge current as large as the charging current until the cell voltages reached 1.0 V.

As apparent from FIG. 4, Cell A reduced its capacity in the course of the cycles by a smaller ratio than Cell X. In other words, deterioration of the negative electrode was better restricted in Cell A than in Cell X, which means Cell A had excellent cycle characteristic than Cell X.

As for the weight decreased in the course of the cycles, Cell A was smaller than Cell X. This means generation of hydrogen gas was better restricted in the Cell A than Cell X.

The above two results are attributed to the higher conductivity of the hydrogen-absorbing alloy electrode of Cell A than that of Cell X.

Embodiment II

Embodiments I through [VII] *VI* according to the present invention

Cells $B_1$ through [$B_7$] $B_6$ were produced by the same method as Cell A except that $Cu_2O$, $Cu(OH)_2$, $Ag_2O$, $AuO_2$, $Au(OH)_3$, *and* PbO, [and $Ti_2O_3$] were respectively used instead of CuO.

Experiment

Cells $B_1$ through [$B_7$] $B_6$, A and X were subjected to a cycle test to check the decreased weight of each cell after the 50th cycle. The results are shown in Table 1. The experiment conditions were the same as in Embodiment I.

TABLE 1

| Cell | Metal oxide or hydroxide added | Decreased weight % |
|---|---|---|
| A | CuO | 0.07 |
| $B_1$ | CuO | 0.08 |
| $B_2$ | $Cu(OH)_2$ | 0.05 |
| $B_3$ | $Ag_2O$ | 0.09 |
| $B_4$ | $AuO_2$ | 0.11 |
| $B_5$ | $Au(OH)_3$ | 0.10 |
| $B_6$ | PbO | 0.21 |
| [$B_7$ | $Ti_2O_3$ | 0.19] |
| X | None | 0.49 |

As well as Cell A, Cells $B_1$ through [$B_7$] $B_6$, each of which decreased smaller weight than Cell X, were excellent in cycle characteristic.

Moreover, Cells $B_1$ through $B_5$ (employing an oxide or hydroxide of Cu, Ag or Au, which belong to the Ib group) decreased smaller weight than Cell $B_6$ [and $B_7$] (employing [other] *another* metal [oxides] *oxide*). This is attributed to that the excellent conductivity of Cu, Ag and Au generated by reduction in the hydrogen-absorbing alloy electrode highly enhances the conductivity of the above electrode.

The grain size of the metal oxide or hydroxide employed in the present invention is desirably as small as possible, considering its distribution in the cell. It is confirmed through experiments, though, that good enough effects are obtained if the average grain size is 50μm or less.

If the above metal oxide or hydroxide is added excessively, its reduction requires a huge amount of electricity in the hydrogen-absorbing alloy electrode during the charge-discharge cycles for electrochemical formation or the like. When this occurs, the negative electrode is not charged enough, which damages the balance in the charging amount between the positive and negative electrodes. This deteriorates the cycle characteristic of the cell. Experiments have confirmed that it is desirable to set the amount of the metal oxide or hydroxide in the following way: the amount of electricity required to reduce the metal oxide or hydroxide is obtained first, and the amount of the above metal oxide or hydroxide is set so that the above electricity amount is 15% or less of the capacity of the completed hydrogen-absorbing alloy electrode.

Employable as the hydrogen-absorbing alloy instead of $MmNi_{3.2}CoAl_{0.2}Mn_{0.6}$ are a rare earth alloy such as $LaNi_3Co_2$, Ti-Ni alloy, Ti-Mn alloy, Ti-Fe alloy, Mg-Ni alloy, Ti-Zr alloy or Zr-Mn alloy.

In the above embodiments, the hydrogen-absorbing alloy powders were obtained by pulverizing the hydrogen-absorbing alloy ingot. Needless to say, however, the hydrogen-absorbing alloy powders may be obtained by the atomizing method, the low pressure gas evaporation method, the active hydrogen - molten metal reaction method, the chloride reaction method, the pyrolyzing method or the volatile condensation method.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A hydrogen-absorbing alloy electrode for use in an alkaline storage cell, the electrode comprising:
   a hydrogen-absorbing alloy for reversibly absorbing and desorbing hydrogen; and
   a metal oxide existing in the state of a metal in a range of electric potential where said hydrogen-absorbing alloy electrochemically absorbs and desorbs hydrogen in an alkaline electrolyte;
   wherein said metal oxide is at least one selected from the group consisting of CuO, $Cu_2O$, $Ag_2O$, $Ag_2O_2$, PbO, [$Ti_2O_3$,] $AuO_2$ and $Au_2O_3$.

2. A hydrogen-absorbing alloy electrode of claim 1, wherein said metal oxide has an average grain size of 50 μm at the maximum.

3. A hydrogen-absorbing alloy electrode of claim 1, wherein an amount of said metal oxide is set so that an amount of electricity required to reduce said metal oxide into a metal is 15% at the maximum of a capacity of the hydrogen-absorbing alloy electrode.

4. A hydrogen-absorbing alloy electrode for use in an alkaline storage cell, the electrode comprising:
   a hydrogen-absorbing alloy for reversibly absorbing and desorbing hydrogen; and
   a metal hydroxide existing in the state of a metal in a range of electric potential where said hydrogen-absorbing alloy electrochemically absorbs and desorbs hydrogen in an alkaline electrolyte;
   wherein said metal hydroxide is at least one selected from the group consisting of $Cu(OH)_2$[, $Ti(OH)_3$] and $Au(OH)_3$.

5. A hydrogen-absorbing alloy electrode of claim 4, wherein said metal hydroxide has an average grain size of 50 μm at the maximum.

6. A hydrogen-absorbing alloy electrode of claim 4, wherein an amount of said metal hydroxide is set so that an amount of electricity required to reduce said metal hydroxide into a metal is 15% at the maximum of a capacity of the hydrogen-absorbing alloy electrode.

7. A manufacturing method of a hydrogen-absorbing alloy electrode for use in an alkaline storage cell, comprising the steps of:
   producing hydrogen-absorbing alloy powders;
   kneading the above powders, a metal oxide existing in the state of a metal in a range of electric potential where the hydrogen-absorbing alloy electrochemically absorbs and desorbs hydrogen in an alkaline electrolyte, and a binder into a paste, wherein the metal oxide is at least one selected from the group consisting of CuO, $Cu_2O$, $Ag_2O$, $Ag_2O_2$, PbO, [$Ti_2O_3$,] $AuO_2$ and $Au_2O_3$;
   coating the paste on a conductive substrate.

8. A manufacturing method of claim 7, wherein the metal oxide has an average grain size of 50 μm at the maximum.

9. A manufacturing method of claim 7, wherein an amount of the metal oxide is set so that an amount of electricity required to reduce the metal oxide into a metal is 15% at the maximum of a capacity of the hydrogen-absorbing alloy electrode.

10. A manufacturing method of a hydrogen-absorbing alloy electrode for use in an alkaline storage cell, comprising the steps of:

producing hydrogen-absorbing alloy powders;

kneading the above powders, a metal hydroxide existing in the state of a metal in a range of electric potential where the hydrogen-absorbing alloy electrochemically absorbs and desorbs hydrogen in an alkaline electrolyte, and a binder into a paste, wherein the metal hydroxide is at least one selected from the group consisting of $Cu(OH)_2$ [, $Ti(OH)_3$] and $Au(OH)_3$; and coating the paste on a conductive substrate.

11. The method of claim 10, wherein the metal hydroxide has an average grain size of 50 μm at the maximum.

12. The method of claim 10, wherein an amount of the metal hydroxide is set so that an amount of electricity required to reduce said metal hydroxide into a metal is 15% at the maximum of a capacity of the hydrogen-absorbing alloy electrode.

* * * * *